United States Patent Office 3,655,612
Patented Apr. 11, 1972

3,655,612
PRESERVATIVE AND IMPERVIOUS SURFACE COATING PASTE
Gianfranco Stella, Milan, Italy, assignor to MPM-Materiali Protettivi Milano S.R.L., Milan, Italy
No Drawing. Filed Dec. 31, 1968, Ser. No. 788,346
Claims priority, application Italy, Nov. 2, 1968, 11,574A/68, Patent 828,105
Int. Cl. C08c *11/16*
U.S. Cl. 260—41.5          2 Claims

ABSTRACT OF THE DISCLOSURE

A preservative and impervious surface coating paste, consisting of a mixture of a vehicle made of an elastomer, a pigment made of a metal powder, preferably aluminum or copper, a thickener made of a fibrous filler and an additive of synthetic resins, which may be applied in a single coat to any supporting surface without requiring undercoats, fillers or primers.

BACKGROUND OF THE INVENTION

The present invention relates to a preservative and impervious surface coating paste having the dual function of protection against weather agents and impermeabilization.

In the field of preservative paints, it is known to use paints containing metal pigments, usually aluminum, which is employed both as a dyestuff and protecting surface layer in consequence of the known leafing power.

The vehicle is usually comprised of synthetic resins of different kinds, for paints of better quality, or merely of bituminous solutions.

In these paints aluminum develops its preservative action because of the leafing power, that is to set as a cover or tile on the outer surface of the paint layer. The thickness of the said layers is in the range of 15–20 microns.

While a power of protection against weather agents for the surfaces on which it is spread, may be ascribed to such products, it is clearly excluded that they can also have the function of waterproofing layer.

SUMMARY OF THE INVENTION

The primary object of the present invention is to provide a novel product which may be applied on every kind of surface without undercoats, fillers or primers, having the dual function of protection against weather agents and impermeabilization and moreover elasticity features which are particularly valuable for said applications.

This and other objects are obtained by providing a thick product in form of a paste to be spread by a brush or sprayed, said product consisting of a mixture of several ingredients, wherein the vehicle is substantially made of elastomers and the pigment of metal powder, more particularly aluminum powder and copper powder, and moreover containing additives adapted for causing the metal pigment to be distributed throughout the whole thickness of the paste.

The so obtained product may be spread with a substantial thickness, and thicknesses in the range of 100–300–500 microns are readily obtained with a single coat, so as to warrant a reliable function of waterproofing layer because of the particular features of the vehicle, taken in connection with the thickness dimension. The metal pigment is uniformly distributed throughout the thickness in a high percentage and its contact with iron surfaces has an anti-oxidizing function.

The deep internal presence in the layers of the metal pigment, together with the features of high elasticity and waterproofness of the rubber-like vehicle, give the product a high preservative action and a considerable duration of said effect.

For obtaining the suspension of the metal pigment in the product mass, it has been found that it is advisable to add in the mixture poorly reactive thickeners such as asbestos, fiberglass or other poorly reactive materials having the same action.

In order to give the instant product a good adhesive power on any support, additives based on synthetic resins are also added to the mixture.

To sum up, with the coating made employing the paste of the present invention, one can obtain by a single layer of a sole product a covering coating responsive to the following requirements: high anti-oxidant power, considerable protection, reliable waterproofing, excellent resistance to weather agents, good adhesive power.

DETAILED DESCRIPTION OF THE PREFERRED EMBODIMENTS

By way of non-limiting example of the invention, some details are given hereinbelow of the composition of the mixture forming the paste of the present invention, said details being approximately considered the ranges within which the ingredients of the mixture composition may be varied, the percentages being given by weight at the dry state, as it has to be understood that many types of solvents may be used, capable of making a solution of the vehicle: elastomers 20–40%; aluminum 40–50%; additives 5–15%; thickeners 10–15%.

A more detailed description of the mixture composition of the present invention is given in the following example illustrating a preferred embodiment of the invention.

EXAMPLE

Composition of the paste (by weight):

Vehicle: elastomers (preferably butadiene polymers) 11–15%

Pigment: aluminum (in the form of paste or powder) 20–22%

Thickener: fibrous filler (asbestos, fiberglass and the like) 11–12%

Additive: synthetic resins (cumaronic or polyolefinic resins) 7–8%

Aromatic and aliphatic solvents up to 100%

Preparation of the paste

Elastomer and synthetic resin are mixed in a double cylinder mixer of the type for treating rubber at a temperature not exceeding 60–70° C. until a homogeneous compound is obtained.

A solution of the compound is made at a concentration of 35–40% in the above quoted solvents and in a dough mixer.

A solution of aluminum is prepared in the remaining solvents until the most homogeneous solution is obtained.

The fibrous filler is then added to the compound solution in a vessel provided with an arm kneader at a low revolving speed.

The mixture obtained is diluted with said aluminum solution and the product is made homogeneous with a slow agitation.

Results of tests on the product in form of paint (resistance to salt mist)

Three samples of the paste are applied on iron plates and subjected to salt mist obtained from a 5% solution of NaCl at 25° C. for 1000 hours. At the end of the test, the samples are practically unaltered.

Moisture vapour permeability (ASTM D–1653/62)

The result of this test (0.030 mg./cm.$^2$/mm./day) can be considered excellent, giving values of the same order as good hot-melt coatings based on wax.

Weatherometer aging

Paint was submitted to a very severe weatherometer test (2 weeks 100% relative humidity at 25–30° C. in constant presence of UV light). The paint darkened a little, but corrosion protection was good with coating thickness of 50μ dry.

I claim:

1. A preservative and impervious surface coating paste whose dry ingredients are in an aromatic or aliphatic solvent and consist essentially of a mixture of 20 to 40% polybutadiene, 40 to 50% aluminum, 5 to 15% of an additive selected from the group consisting of coumaronic resins and polyolefin resins, 10 to 15% of a material selected from the group consisting of asbestos and fiber glass in the dry state, the percentage for said dry ingredients being on a dry weight basis.

2. A preservative and impervious surface coating paste consisting essentially of a mixture of 11 to 15% polybutadiene, 10 to 20% aluminum powder, 11 to 12% asbestos or first glass, 7 to 8% coumaronic resins or polyolefin resins, and the remainder an aromatic or aliphatic solvent, all parts being by weight.

References Cited

UNITED STATES PATENTS

| | | | |
|---|---|---|---|
| 3,077,424 | 2/1963 | Maker et al. | 260—40 |
| 3,441,530 | 4/1969 | Bauer et al. | 260—41.5 |
| 3,332,055 | 7/1967 | Bogner | 260—41.5 R |
| 3,503,919 | 3/1970 | Cadus | 260—41.5 A |

OTHER REFERENCES

Whitby: Synthetic Rubber (Wiley), New York (1954), pp. 410, 411 and 561.

MORRIS LIEBMAN, Primary Examiner

H. H. FLETCHER, Assistant Examiner

U.S. Cl. X.R.

260—29.1 R, 829, 888

UNITED STATES PATENT OFFICE
CERTIFICATE OF CORRECTION

Patent No. 3,655,612    Dated April 11, 1972

Inventor(s) Gianfranco Stella

It is certified that error appears in the above-identified patent and that said Letters Patent are hereby corrected as shown below:

Claim 2, line 4, "first" should read --fiber-- .

Signed and sealed this 18th day of July 1972.

(SEAL)
Attest:

EDWARD M. FLETCHER, JR.    ROBERT GOTTSCHALK
Attesting Officer          Commissioner of Patents